W. M. DEUTSCH.
Tubular Belting.
No. 198,451.  Patented Dec. 25, 1877.
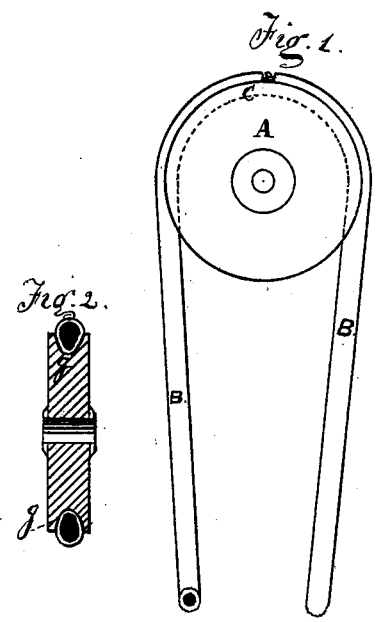

UNITED STATES PATENT OFFICE.

WILLIAM M. DEUTSCH, OF ELIZABETH, NEW JERSEY.

IMPROVEMENT IN TUBULAR BELTING.

Specification forming part of Letters Patent No. 198,451, dated December 25, 1877; application filed October 5, 1877.

*To all whom it may concern:*

Be it known that I, WILLIAM M. DEUTSCH, of Elizabeth city, in the county of Union and State of New Jersey, have invented certain new and useful Improvements in Tubular Belting; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Referring to the drawings, A is a grooved pulley or band wheel, employed for elevating or other purposes. B is a tubular belt, provided with any suitable screw-coupling C, passing over and operating the pulley A, for hoisting or other purposes, by hand or otherwise. This tubular belt is made of vulcanized rubber and canvas, or an equivalent thereof.

The advantages of the aforesaid tubular belting are as follows, to wit: First, the belt conforms itself to the recess or groove upon the edge of the wheel or pulley A; secondly, as the belt is tightened it expands and spreads over the entire friction-surface of the groove $g$ of the wheel A, so that it is not so liable to slip as the ordinary belt, and, when employed for hoisting purposes, (by hand,) it is more yielding and less liable to blister the hands of the operator than the ordinary rope now in common use, and from its adhesive properties the pulley A is kept uniformly moving in the required direction, (I believe,) at less labor and wear upon machinery than by any other belting.

The novelty of my invention consists in the application of a tubular belt, constructed of india-rubber and canvas, or otherwise, so that the said belt will expand and better conform itself to the shape of the grooved bearing $g$ upon the revolving edge of the pulley A, and yield to the grasp of the hand of the operator when employed for elevating purposes, &c.

What I claim as novel and useful, and wish to protect by Letters Patent of the United States, is—

The flexible tubular belting A, provided with the screw-coupling C, all arranged and adapted for use as shown and described.

In testimony that I claim the foregoing as my own I affix my signature in presence of two witnesses.

WILLIAM M. DEUTSCH.

Witnesses:
    JAMES P. MCLEAN,
    ROBERT A. MORRISON.